United States Patent
Hansen

(10) Patent No.: US 7,192,067 B2
(45) Date of Patent: Mar. 20, 2007

(54) IMPACT DAMPER ASSEMBLY FOR AN AUTOMOBILE

(75) Inventor: Thomas Hansen, Bergisch-Gladbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 11/190,077

(22) Filed: Jul. 26, 2005

(65) Prior Publication Data

US 2006/0022473 A1 Feb. 2, 2006

(30) Foreign Application Priority Data

Jul. 29, 2004 (DE) .................. 10 2004 036 929

(51) Int. Cl.
*B60R 19/34* (2006.01)
*B60R 19/36* (2006.01)

(52) U.S. Cl. .................. 293/133; 293/132; 293/155; 296/187.03

(58) Field of Classification Search ........ 293/120–122, 293/132, 133, 155; 188/371, 374, 376, 377; 296/187.03, 187.09, 187.11
See application file for complete search history.

(56) References Cited

U.S. PATENT DOCUMENTS

| | | | | |
|---|---|---|---|---|
| 3,899,047 A | * | 8/1975 | Maeda et al. | 188/374 |
| 3,915,486 A | * | 10/1975 | Maeda et al. | 293/133 |
| 4,181,198 A | * | 1/1980 | Lindberg | 188/371 |
| 5,403,049 A | * | 4/1995 | Ebbinghaus | 293/133 |
| 5,875,875 A | * | 3/1999 | Knotts | 188/374 |
| 6,027,105 A | * | 2/2000 | Dohrmann et al. | 267/139 |
| 6,467,836 B1 | * | 10/2002 | Miller et al. | 296/187.03 |
| 6,536,990 B2 | | 3/2003 | Schubert et al. | |
| 6,802,548 B2 | * | 10/2004 | Shimotsu | 293/133 |
| 6,832,669 B2 | * | 12/2004 | Schobergegger et al. | 188/377 |
| 6,871,889 B2 | * | 3/2005 | Ericsson | 293/132 |
| 6,908,129 B2 | * | 6/2005 | Shimotsu | 293/133 |
| 6,926,325 B2 | * | 8/2005 | Frank | 293/133 |
| 6,991,282 B2 | * | 1/2006 | Suzuki et al. | 296/187.03 |

FOREIGN PATENT DOCUMENTS

| | | |
|---|---|---|
| AT | 402 186 | 2/1997 |
| DE | 297 15 786 | 12/1997 |
| DE | 199 10 978 | 9/1999 |
| DE | 102 06 011 | 8/2003 |
| JP | 08276804 | 10/1996 |
| JP | 2001158312 | 6/2001 |
| JP | 2003048498 | 2/2003 |
| WO | WO9928162 | 6/1999 |

* cited by examiner

*Primary Examiner*—D. Glenn Dayoan
*Assistant Examiner*—Greg Blankenship
(74) *Attorney, Agent, or Firm*—Norris, McLaughlin & Marcus, PA

(57) ABSTRACT

Impact damper assembly for an automobile, in particular for supporting a bumper 5 on an automobile chassis, with an inner tube 2 movably arranged in an outer tube 3, wherein both tubes 2, 3 have an approximately mutually parallel taper 16, 19, wherein the taper 19 of the inner tube 2 is encompassed by the taper 16 of the outer tube 3, and wherein at least one of the two tubes 2, 3 can be deformed during the movement by the taper 16, 19 of the two tubes. The invention is characterized in that the impact damper assembly includes an additional deformable stiffening element 22.

12 Claims, 5 Drawing Sheets

IMPACT DAMPER ASSEMBLY FOR AN AUTOMOBILE

BACKGROUND OF THE INVENTION

1. Field of the Invention

The invention relates to an impact damper assembly for an automobile, with an inner tube movably arranged inside an outer tube, wherein at least one tube is deformable by a relative displacement between the two tubes caused by an impact.

Such impact damper assemblies are employed in automobiles to convert the impact energy generated during a collision at least partially into deformation work. This arrangement minimizes damage to the automobile chassis, for example to the longitudinal chassis rails, and may even entirely prevent such damage at low speed. Damage to and deformation of the vehicle caused by a collision are reduced, which not only increases the safety for the vehicle occupants by maintaining the integrity of the passenger compartment, but also keeps the repair costs down. An insurer may also place the vehicle type in a more favorable insurance rating step.

2. Description of the Related Art

The patent AT 402 186 B already discloses an impact damper assembly with two tubes that are displaceable relative to each other, whereby an inner tube is arranged inside an outer tube. The inner tube and the outer tube each have a frusto-conical taper, wherein the frusto-conical taper of the outer tube encloses the frusto-conical taper of the inner tube. Moreover, the walls of the inner tube and the walls of the outer tube are approximately mutually parallel in the region of the frusto-conical taper. In the event of a vehicle collision, the inner tube is pushed into the outer tube and deformed so as to reduce the outside diameter of the inner tube. The impact energy is thereby converted into deformation work.

Disadvantageously with this arrangement, in particular the inner tubes tend to buckle or lock in the event of an impact from the side. Effective deformation work is then no longer produced and the impact energy directly causes deformation of the vehicle chassis, associated with substantial damage to the vehicle chassis, loss of safety, and increased repair costs. This performance has a negative impact when the damage class for this type of vehicle is set according to newer guidelines.

It is therefore an object of the invention to provide an impact damper assembly with two tubes, which are arranged inside one another for relative movement therebetween, wherein the impact damper assembly improves the rigidity for side impacts. The impact damper assembly should also produce sufficient deformation work in the event of a skewed impact to lessen the consequences of a vehicle collision and reduce, in particular, the repair costs and deformation of the vehicle chassis.

SUMMARY OF THE INVENTION

The object is solved by an arrangement with the features of the independent claim. Advantageous embodiments and modifications of the invention are recited in the depended claims.

An impact damper assembly for an automobile, in particular for supporting a bumper on an automobile chassis, includes an inner tube movably arranged inside an outer tube, wherein both tubes have a mutually approximately parallel taper. The taper of the inner tube is encompassed by the taper of the outer tube, and at least one of the two tubes can be deformed during the movement by the taper. According to the invention, it is proposed that the impact damper assembly includes an additional deformable stiffening element.

According to advantageous embodiment, the stiffening element is arranged between the inner tube and the outer tube, wherein the stiffening element is indirectly or directly connected, on one hand, with the inner tube and, on the other hand, with the outer tube. According to a particularly advantageous embodiment, the stiffening element has a conical shape and surrounds at least one of the two tubes.

The lateral forces generated in the event of a skewed impact are absorbed by the additional stiffening element, whereby the stiffening element prevents the inner tube or the outer tube from buckling or bending. The inner tube is then free to move relative to the outer tube. Stated differently, the inner tube can move relative to the outer tube even under an impact at an angle, and the impact energy can still be converted into deformation work. The stiffening element itself also deforms when the inner tube moves relative to the other tube, and produces additional deformation work. In any event, even with an impact at an angle, deformation work is performed first inside the impact damper assembly before chassis components can deform or be damaged, because the force required to deform the impact damper assembly is smaller than the stiffness parameters of the vehicle chassis or of the chassis components connected to the impact damper assembly. As a result, the stiffening element of the impact damper assembly contributes significantly to improving the safety of the automobile chassis and almost entirely prevents damage to or deformation of the chassis, because a significant portion of the impact energy is already obliterated by the impact damper assembly before being transferred to the vehicle chassis. Particularly at low speed impacts, the impact damper assembly converts the entire impact energy into deformation work, which keeps repair costs low.

According to advantageous embodiment, the additional conical stiffening elements include lateral reinforcing fins, which can have an elongated or elliptical shape and can be oriented with their longer dimension substantially perpendicular to the longitudinal axis of at least one of the two tubes. If the lateral forces become too great due to a skewed vehicle impact or excessive speed during the impact, then the reinforcing fins bend sideways, allowing the stiffening element to deform in a predictable manner. The inner tube can then no longer move relative to the outer tube. However, deformation work is here also performed first by the impact damper assembly, before the vehicle chassis or a component of the chassis are damaged. This lessens damage to the vehicle chassis and improves the overall vehicle safety.

According to an advantageous embodiment of the invention, the stiffening element can be supported on a mounting flange, which receives the outer tube in a recess and which can be connected with a chassis component, preferably for example a longitudinal chassis beam. With this arrangement, the stiffening element is indirectly connected to the outer tube, creating an advantageous modular design of the impact damper assembly. The impact damper assembly can then be manufactured as a separate module and readily installed on the vehicle chassis, which reduces the manufacturing costs.

According to another advantageous embodiment to the invention, the outer tube can have a radially outwardly projecting collar, which can be arranged on the edge of the recess on the mounting flange and can connect the outer tube to the mounting flange by a welded connection. The impact damper assembly can then be easily installed. According to the invention, the outer tube can advantageously include a rated break point, so that the outer tube can be separated from the mounting flange. This is particularly beneficial for vehicle collisions at high speed. Because the tubes then do not deform due to the high tensile stress, the outer tube breaks off at the rated break point and can together with the inner tube be displaced towards the vehicle chassis. An additional portion of the impact energy is converted into deformation work by the additional stiffening element. In any event, the impact damper assembly or parts thereof then move also relative to the vehicle chassis to lower the impact energy, before the vehicle chassis itself is deformed or damaged, which also improves the safety of the vehicle chassis.

According to another embodiment of the invention, a gap can be formed between the inner tube and the outer tube at least in the region of the recess. The gap allows the applied lateral forces to bend or slant the inner tube within certain limits, thereby preventing the inner tube from locking against the outer tube. The inner tube can then still move relative to the outer tube in spite of the applied lateral forces, so that at least one of the two tubes can generate deformation work. In an advantageous embodiment, the inside wall of the outer tube and outside wall of the inner tube abut one another in a region of the outer tube located at the end of the outer tube that faces away from the bumper. The lever arm operative between this region and the mounting flange can potentially cause the tilt of the inner tube relative to the mounting flange to increase, when subjected to a lateral force and due to the gap between the inner tube and the outer tube in the region of the recess, so that the inner tube can still be displaced relative to the outer tube.

Conversion of the impact energy into deformation energy can be significantly enhanced by employing a sliding element between the inner tube and the outer tube at least in the region of the taper of the inner tube. This can reduce friction between the various components in a predeterminable manner. The sliding element can be implemented as a separate component and made, for example, of a plastic or Teflon bushing, or can be molded on the outer tube or applied as a plastic coating to the inner tube.

With the invention, impact energy can be better converted into deformation work under various conceivable impact situations, in particular in the event of a skewed or high-speed impact. The crash pulse for releasing the airbag can then also be more safely detected, because the certain deformation of the impact damper assembly supplied a reliable signal.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

An exemplary embodiment of the invention will now be described in more detail. The corresponding drawings show in.

DETAILED DESCRIPTION OF THE PRESENTLY PREFERRED EMBODIMENTS

Figure 1:
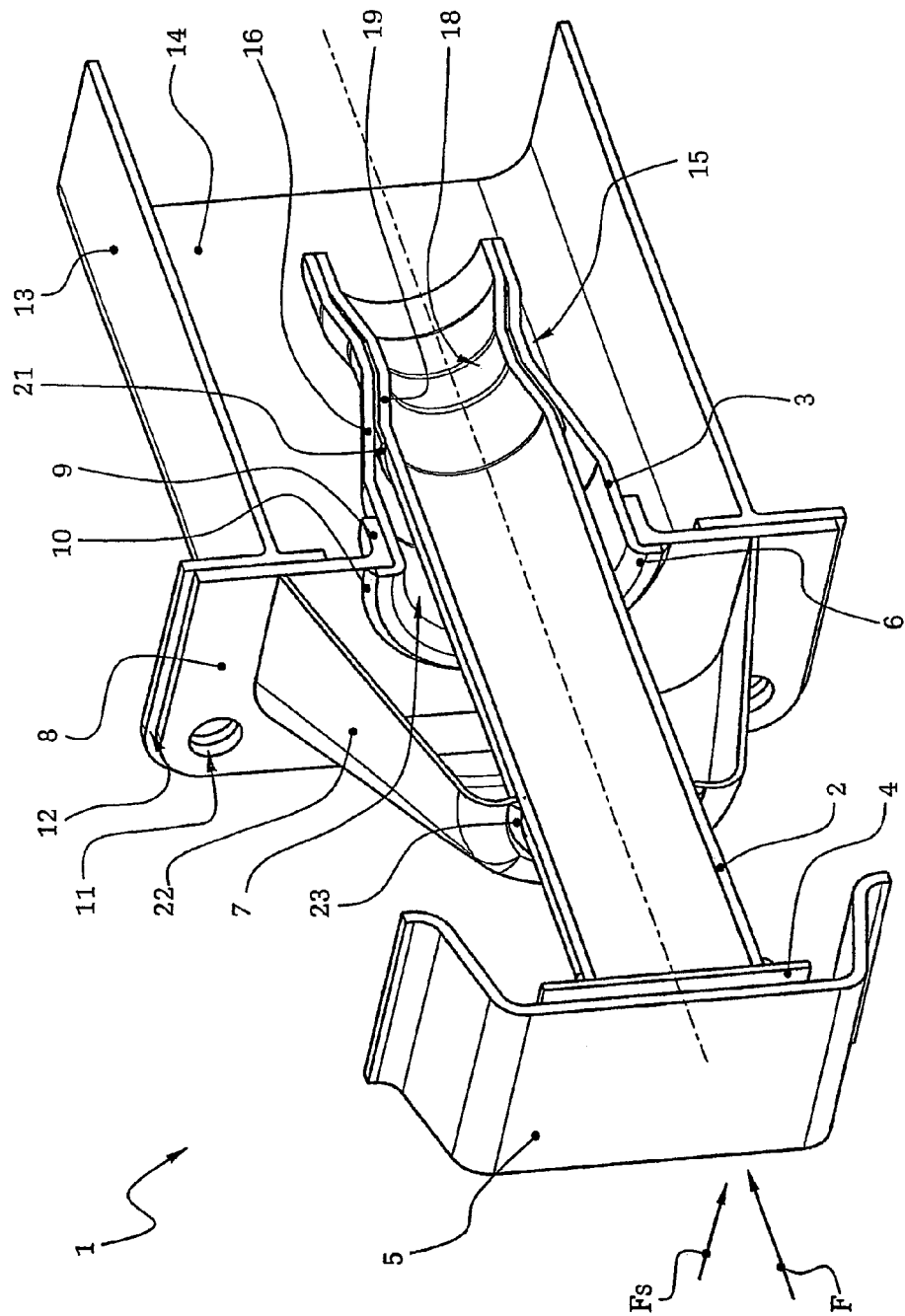
FIG. 1 a three-dimensional sectional view of the impact damper assembly of the invention in an initial state, FIG. 2 a cross sectional view of the impact damper assembly of the invention in the initial state, FIG. 3 a three-dimensional sectional view of the impact damper assembly of the invention in a deformed state, FIG. 4 a cross sectional view of the impact damper assembly of the invention in the deformed state, and FIG. 5 a view from the rear of the impact damper assembly of the invention in an initial state.
Figure 2:
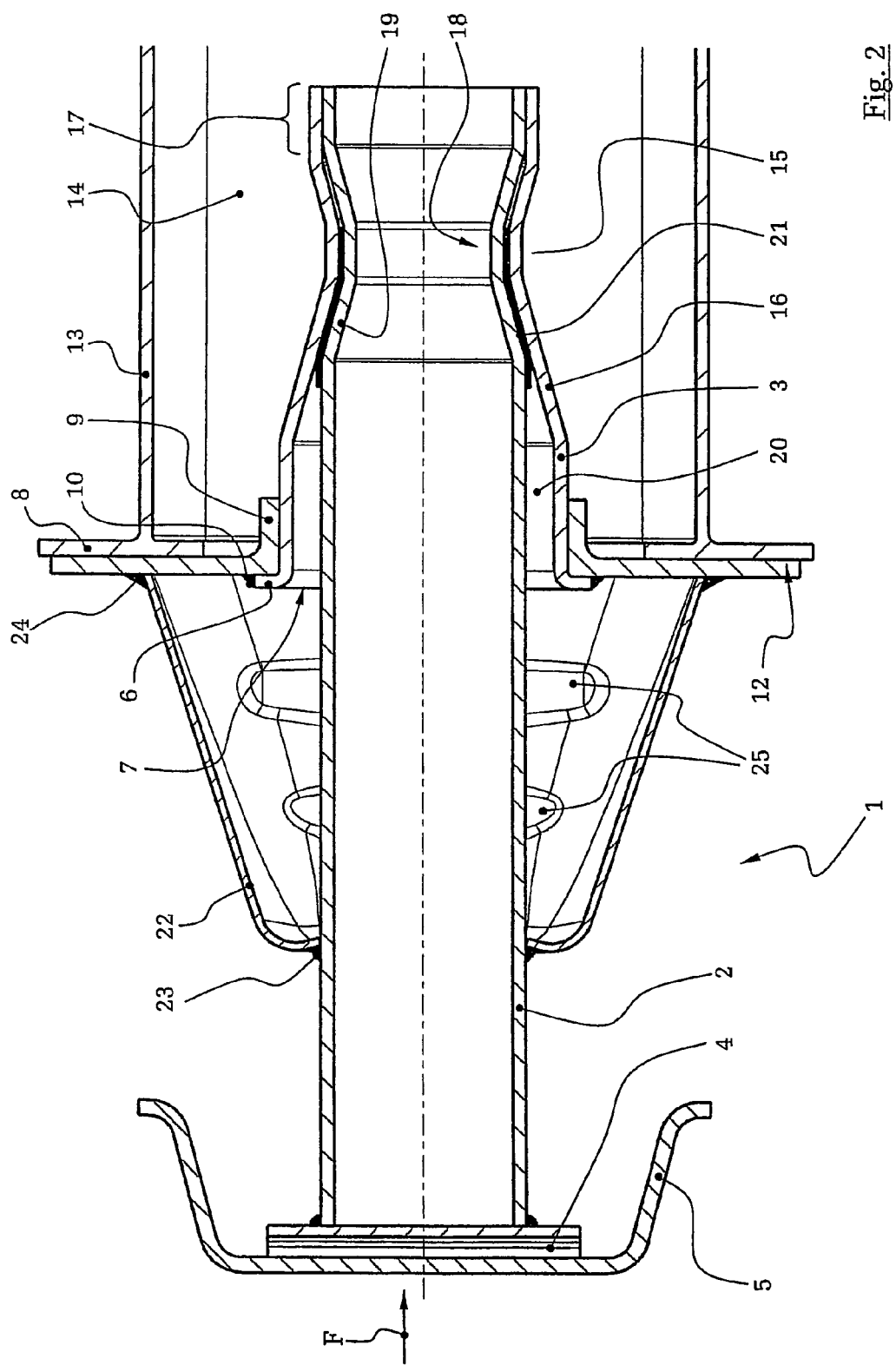

FIGS. 1 and 2 show an impact damper assembly 1 with an inner tube 2 disposed inside an outer tube 3. The inner tube 2 is connected by a mounting plate 4 with a bumper 5. The mounting plate 4 and the inner tube 2 are connected, for example, by a weld connection. The cross-section of the inner tube 2 and the outer tube 3 along their respective longitudinal axis is essentially circular, but can deviate from a circular shape depending on the requirements for stiffness.

The outer tube 3 has an outwardly protruding collar 6 which is supported against the edge of the recess 7 of a mounting flange 8. The recess 7 of the mounting flange 8 is formed with a tubular extension 9, whereby the outside wall of the outer tube 3 abuts the inside wall of the recess 7 or the tubular extension 9. In this exemplary embodiment, the outer tube 3 is connected along the collar 6 with the mounting flange 8 by a weld connection 10. Alternatively, the outer tube 3 and the mounting flange 8 can also be joined by an adhesive joint.

The mounting flange 8 is connected by a screw connection 11 to a flat end face 12 of a hollow longitudinal chassis rail 13. However, unlike in the aforedescribed embodiment, the support flange could also be secured to another chassis component. Substantial portions of the outer tube 3 and the inner tube 2 are disposed inside the outer tube 3 in the hollow space 14 of the longitudinal chassis rail 13. This tubular extension 9 of the mounting flange 8 also extends into the hollow space 14 of the longitudinal chassis rail 13, so that the collar 6 of the outer tube 3 rests against the mounting flange 4 outside the longitudinal chassis rail 13.

The outer tube 3 has a constriction 15 which is spaced from the recess 7 and the tubular extension 9, whereby the outer tube 3 has a frusto-conical taper 16 facing the inside of the hollow space 14. The other tube 3 then widens again to a cone on the side facing away from the collar 6, with its end a region 17 assuming a constant circular cross-section. The inner tube 2 is received inside the outer tube 3 and also has a constriction 18 at an axial position identical to that of the constriction 15 of the outer tube 3. The inner tube 2 has also a frusto-conical taper 19 located in the region of the taper 16 of the outer tube 3 and parallel with the taper 16. The taper 19 has the same slope as the taper 16, but is shorter than the taper 16 of the outer tube 3. The outside diameter of the inner tube 2 has in the direction of the bumper 5 a constant circular cross-section with a constant outside diameter and protrudes from the outer tube 3. The outside diameter of the inner tube 2 is also smaller than the inside diameter of the outer tube 3 in the region of the recess 7 of the mounting flange 8 and of the tubular extension 9 in this region, producing a gap 20 between the inner tube 2 and the outer tube 3. The inner tube 2 widens again at the end facing the interior of the hollow space 14 of the longitudinal chassis rail 13, causing the outside wall of the inner tube 2 to butt against the inside wall of the outer tube 3 in the region 17.

A sliding element 21 is arranged between the inner tube 2 and the outer tube 3 in the region of the taper 16, 19 and the constriction 15, 18, which reduces the friction coefficient between the inner tube 2 and the outer tube 3 compared to the friction coefficient between the inner tube 2 and the outer tube 3 alone. In this exemplary embodiment, the sliding element 21 is made of plastic which is molded on the outer tube 3. Alternatively, the sliding element can also be made of a Teflon or plastic bushing which can be secured on the outer tube 3 and prevented by a corresponding recess from moving.

Figure 5:
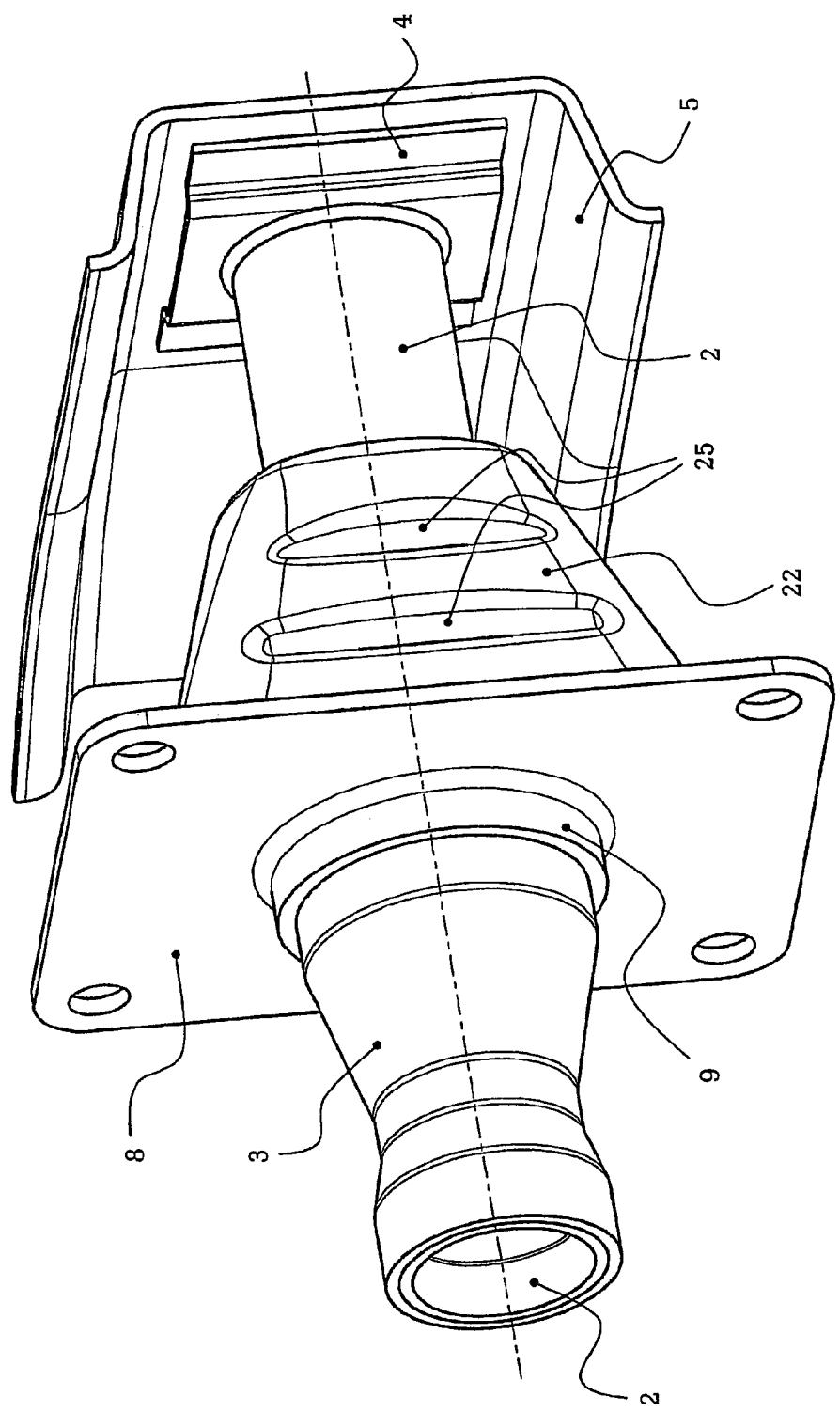

The impact damper assembly 1 includes an additional, essentially conical stiffening element 22 disposed between the bumper 5 and the longitudinal chassis rail 13. One end of the conical stiffening element 22 is connected with the inner tube 2 by a weld connection 23, while the other end is connected by an additional weld connection 24 to the mounting flange 8, which also serves as a support. Alternatively or a combination with the weld connection 23, the stiffening element 22 can also be positively connected with the inner tube 2. The conical stiffening element 22 also includes at least two reinforcing fins 25 arranged on both sides of the inner tube, as shown for example in FIG. 5. Depending on the requirements, the stiffening element can also be provided with several reinforcing fins 25 which are sequentially arranged in the longitudinal direction of the inner tube 2. The reinforcing fins 25 have a substantially elongated or elliptical shape, whereby the longer dimension of the reinforcing fins 25 is oriented perpendicular to the longitudinal axis of the inner tube 2.

The impact damper assembly 1 therefore forms a rigid connection between the longitudinal chassis rail 13 and the bumper 5 and contributes to the overall stiffness of the vehicle chassis. The impact damper assembly 1 is also capable of absorbing towing and rigging forces, in particular when the support for the towing hook is placed directly on the impact damper assembly 1 or the bumper 5. The expansion of the inner tube 2 and the outer tube 3 in the region 17 forms an undercut and prevents the inner tube 2 from being pulled out of the outer tube 3.

Figure 3:
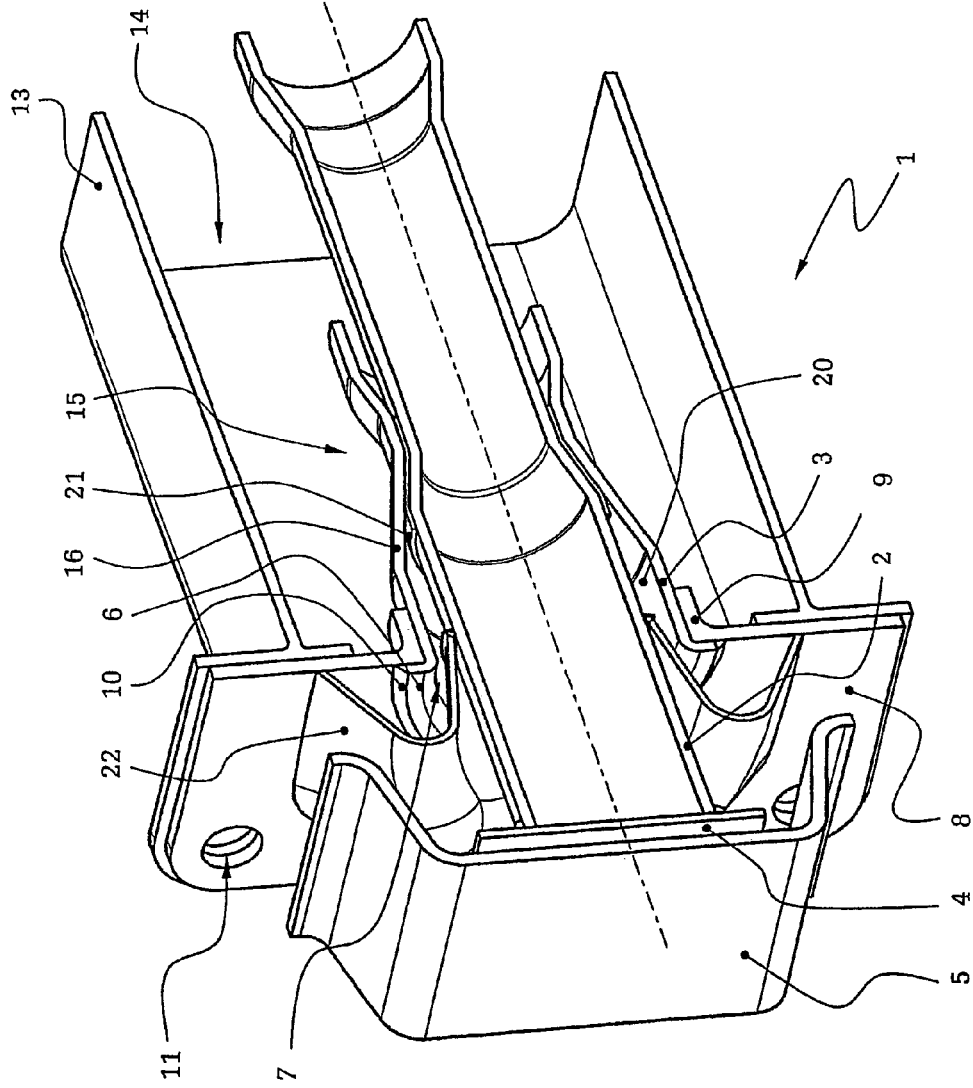
Figure 4:
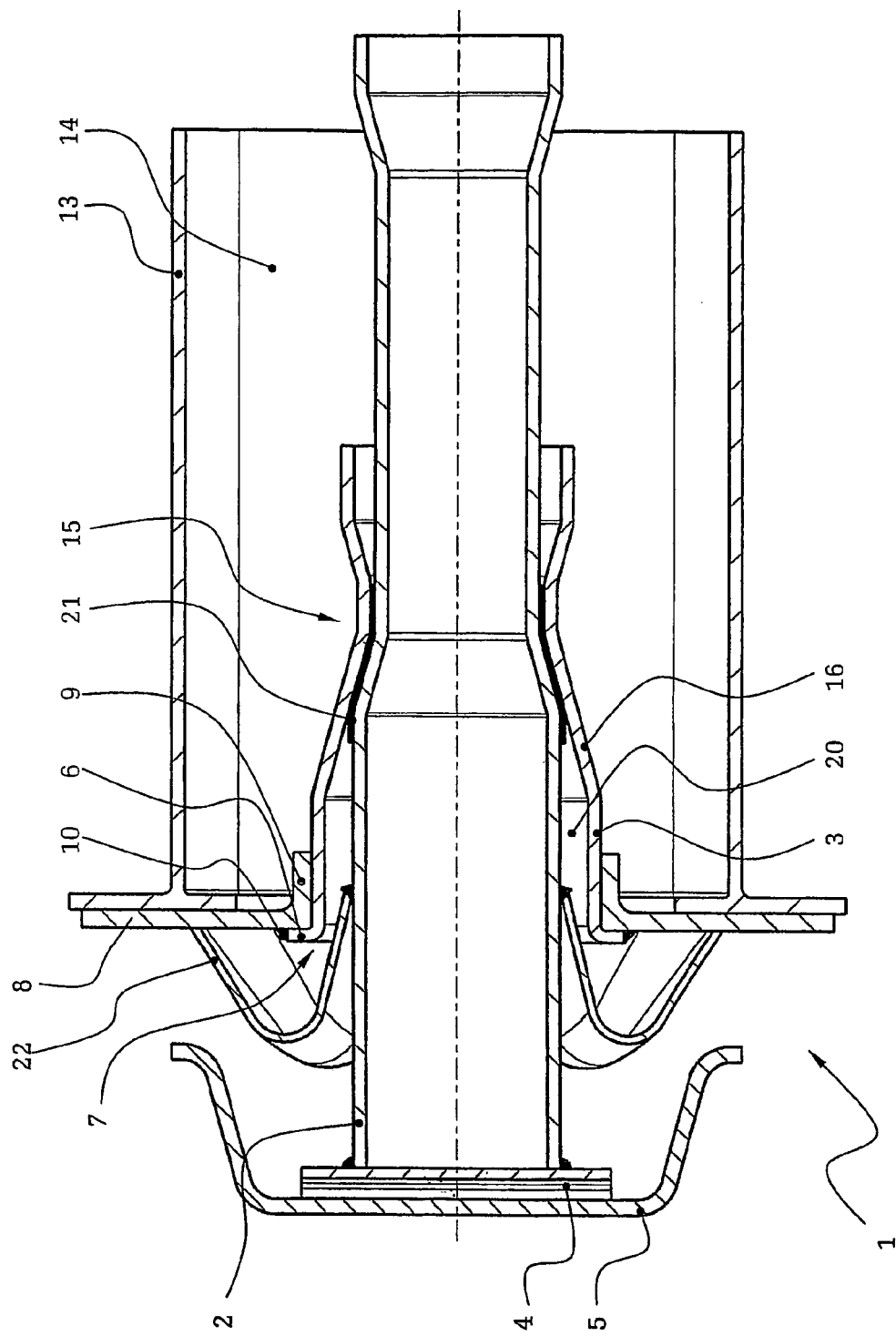

If the vehicle hits an obstacle, then a force F acts on the bumper in the direction of the longitudinal axis of the inner tube 2 for an impact of the vehicle at a 90° angle. If the impact occurs at low speed, then the inner tube 2 is displaced relative to the outer tube 3 into the longitudinal chassis rail 13. The frusto-conical taper 19 of the inner tube 2 applies pressure against the frusto-conical taper 16 of the outer tube 3 via the sliding element 21. Because the outer tube 3 has a greater mechanical strength than the inner tube 2 and/or is stiffer than the inner tube 2, the inner tube 2 deforms, which reduces the diameter of the inner tube 2 is and makes the inner tube longer. The inner tube 2 is thereby pushed into the longitudinal chassis rail 13, as shown in FIGS. 3 and 4. The conical stiffening element 22 also deforms during the movement of the inner tube 2, and the joint between the conical stiffening element 22 and the inner tube 2, i.e., the weld connection 23, is pulled into the interior of the conical stiffening element 22. The weld connection 23 has a greater mechanical strength and can therefore withstand the forces introduced into the weld connection by the impact. The impact energy is thus converted into deformation work at two locations. The stiffness of the impact damper assembly 1 is always smaller than the stiffness of the longitudinal chassis rail 13, so that the impact damper 1 always deforms first and the inner tube 2 is displaced into the longitudinal chassis rail 13, before the force generated by the impact is transferred to the longitudinal chassis rail 13 and can cause the rail 13 to deform. Initially, only the impact damper assembly 1 is damaged. Such deformed impact damper assembly is shown in FIGS. 3 and 4.

The sliding element 21 reduces the friction between the inner tube 2 and the outer tube 3 when the inner tube 2 is displaced into the outer tube 3. Consequently, the introduced impact energy can be reliably converted into deformation work, while at the same time peak forces are eliminated which could damage the longitudinal chassis rail. Plastic molded on the sliding element 21 prevents the sliding element 21 from slipping through when the inner tube 2 is displaced and its diameter is reduced.

During a vehicle impact at higher speed, the tubes, i.e., the inner tube 2, do not deform due to the high tensile forces. The connection between the outer tube 3 and the mounting flange 8 is formed as a rated break point to ensure that the inner tube 2 is displaced into the longitudinal chassis rail 13, before the forces are transferred to the longitudinal chassis rail 13 and can cause deformation of the chassis rail 13. When subjected to these forces, the outer tube 3 is sheared off at the collar 6 and is together with the inner tube 2 pushed into the hollow space 14 of the longitudinal chassis rail 13. The edge of the recess 7 of the mounting flange 4 functions here as a cutting edge. Alternatively, a friction connection or a separate cutting element can also be provided between the outer tube 3 and the mounting flange 4, for example a vulcanized rubber element, which can yield at a corresponding force intensity and break the connection between the outer tube 3 and the mounting flange 4.

If the vehicle hits an obstacle at a skewed angle, i.e. at an angle other than in the perpendicular (90°) direction, then a lateral force $F_s$ acts on the impact damper assembly in addition to an impact force F exerted in the direction of the longitudinal center axis of the inner tube. The lateral force $F_s$ is perpendicular to the impact force F. This lateral force $F_s$ is transferred from the inner tube 2 to the conical stiffening element 22, which is supported by the mounting flange 8. This prevents the inner tube 2 from snapping or bending laterally, which could cause the inner tube 2 to lock against the outer tube 3. In spite of the applied lateral force $F_s$, the impact force F acting in the direction of the longitudinal axis is still able to move the inner tube 2 into the outer tube 3, because as mentioned above, the outer tube 3 is not locked against the inner tube 2. The inner tube 2 is effectively prevented from locking against the outer tube 3 by the sliding element 21 which reduces the friction between the inner tube 2 and the outer tube 3. In addition, the gap 20 between the inner tube 2 and the outer tube 3 enables the inner tube 2 to elastically bend relative to the outer tube 3, without immediately locking the inner tube 2. Because the inner tube is supported by the lever arm formed between the mounting flange 8 and the region 17 where the inner tube 2 abuts the outer tube 3, the outer tube 3 can track the elastic bending of the inner tube 2. In this way, the force F applied in the longitudinal axial direction of the inner tube 2 can also be effective in the region of the taper 16, 19, enabling the inner tube 2 to be pushed into the outer tube 3. With the impact damper assembly 1 of the invention, the impact energy can therefore be converted into deformation work even with a skewed impact, before the longitudinal support rail 13 or another chassis component are deformed.

If the angle of the vehicle impact is too slanted, preventing the inner tube 2 to deform, then the reinforcing grips 25 disposed on the sides of the stiffening element 22 enable the stiffening element 22 to collapse and to absorb impact energy and to initially prevent damage to the longitudinal chassis rail 13. The gap 20 and the aforedescribed lever arm between the region 17 and the mounting flange 8 can also cause the inner tube 2 and the outer tube 3 to tilt in a certain region without transferring a force to the longitudinal chassis rail 13 via the mounting flange, which could damage or deform the longitudinal chassis rail 13. The impact damper assembly 1 therefore always absorbs the initial impact energy and converts the impact energy into deformation work, before the longitudinal chassis rail is deformed or damaged. A deformation of the chassis, which is a difficult and costly to repair, can be effectively prevented at least in low-speed vehicle collisions. Only the impact damper assembly 1 needs be exchanged in these situations, which saves significant cost.

The impact damper assembly 1, in particular the inner tube 2 and the outer tube 3, may be made of materials other than steel. In particular, aluminum, a plastic-metal composite, or another suitable material can be used. For example, the separate sliding element 21 can be eliminated by applying a low-friction plastic coating to the entire inner tube 2, which results in an overall simpler design of the impact damper assembly 1.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

LIST OF REFERENCE SYMBOLS 1 impact damper assembly
2 inner tube
3 outer tube
4 mounting plates
5 bumper
6 collar
7 recess
8 mounting flange
9 tubular expansion
10 weld connection
11 screw connection
12 front side
13 longitudinal chassis rail
14 hollow space
15 constriction
16 taper
17 rearward region
18 constriction
19 taper
20 gap
21 sliding element
22 stiffening element
23 weld connection
24 weld connection
25 reinforcing fin

What is claimed is:

1. An impact damper assembly for an automobile, for supporting a bumper on an automobile chassis, comprising:
an inner tube movably arranged in an outer tube, and
a deformable stiffening element arranged between the inner tube and the outer tube and being indirectly or directly connected with the inner tube and the outer tube,
wherein the inner tube and the outer tube have a mutually approximately parallel taper, with the taper of the inner tube being encompassed by the taper of the outer tube, and
wherein at least one of the inner tube and the outer tube can be deformed during the movement by the taper of the inner tube and the outer tube.

2. An impact damper assembly for an automobile, for supporting a bumper on an automobile chassis, comprising
an inner tube movably arranged in an outer tube, each of the inner tube and outer tube having a mutually approximately parallel taper, with the taper of the inner tube being encompassed by the taper of the outer tube, wherein at least one of the inner tube and the outer tube can be deformed during movement of the tubes by the taper, and
a deformable stiffening element having a conical shape and surrounding at least the inner tube or the outer tube.

3. An impact damper assembly for an automobile, for supporting a bumper on an automobile chassis, comprising
an inner tube movably arranged in an outer tube, each of the inner tube and outer tube having a mutually approximately parallel taper, with the taper of the inner tube being encompassed by the taper of the outer tube, wherein at least one of the inner tube and the outer tube can be deformed during movement of the tubes by the taper, and
a deformable stiffening element supported on a mounting flange, wherein the mounting flange receives the outer tube in a recess and can be connected with a chassis component.

4. The impact damper assembly for an automobile according to claim 3, wherein the chassis component is a longitudinal chassis beam.

5. The impact damper assembly for an automobile according to claim 3, wherein the outer tube has a radially outwardly projecting collar, which is arranged at an edge of the recess on the mounting flange.

6. The impact damper assembly for an automobile according to claim 5, wherein the outer tube is connected to the mounting flange between the mounting flange and the collar formed on the outer tube by a welded connection.

7. The impact damper assembly for an automobile according to claim 5, wherein the outer tube includes a rated break point, so that the outer tube can be separated from the mounting flange.

8. The impact damper assembly for an automobile according to claim 3, wherein a gap is formed between the inner tube and the outer tube at least in a region of the recess.

9. An impact damper assembly for an automobile, for supporting a bumper on an automobile chassis, comprising
an inner tube movably arranged in an outer tube, each of the inner tube and outer tube having a mutually approximately parallel taper, with the taper of the inner tube being encompassed by the taper of the outer tube, wherein at least one of the inner tube and the outer tube can be deformed during movement of the tubes by the taper, and
a deformable stiffening element comprising at least one reinforcing fin.

10. The impact damper assembly for an automobile according to claim 9, wherein the at least one reinforcing fin is elongated or elliptical, wherein a direction of the longer dimension of the reinforcing fin is oriented essentially perpendicular to a longitudinal axis of at least one of the inner tube and the outer tube.

11. An impact damper assembly for an automobile, for supporting a bumper on an automobile chassis, comprising
an inner tube movably arranged in an outer tube, each of the inner tube and outer tube having a mutually approximately parallel taper, with the taper of the inner tube being encompassed by the taper of the outer tube, wherein at least one of the inner tube and the outer tube can be deformed during movement of the tubes by the taper,
a deformable stiffening element, and
a sliding element arranged between the inner tube and the outer tube at least in a region of the taper of the inner tube.

12. An impact damper assembly for an automobile, for supporting a bumper on an automobile chassis, comprising
an inner tube movably arranged in an outer tube, each of the inner tube and outer tube having a mutually approximately parallel taper, with the taper of the inner tube being encompassed by the taper of the outer tube, wherein at least one of the inner tube and the outer tube can be deformed during movement of the tubes by the taper, and
a deformable stiffening element,
wherein an inside wall of the outer tube and an outside wall of the inner tube abut each other in a region at an end of the outer tube that faces away from the bumper.

* * * * *

UNITED STATES PATENT AND TRADEMARK OFFICE
CERTIFICATE OF CORRECTION

PATENT NO. : 7,192,067 B2 Page 1 of 1
APPLICATION NO. : 11/190077
DATED : March 20, 2007
INVENTOR(S) : Hansen It is certified that error appears in the above-identified patent and that said Letters Patent is hereby corrected as shown below:

Column 8, Line 32, "stiffining element" should read -- stiffening element --

Signed and Sealed this

Thirteenth Day of November, 2007

JON W. DUDAS
*Director of the United States Patent and Trademark Office*